(12) United States Patent
Chen

(10) Patent No.: US 9,629,452 B1
(45) Date of Patent: Apr. 25, 2017

(54) ELEVATION TABLE STRUCTURE

(71) Applicant: Su-Ming Chen, Kaohsiung (TW)

(72) Inventor: Su-Ming Chen, Kaohsiung (TW)

( * ) Notice: Subject to any disclaimer, the term of this patent is extended or adjusted under 35 U.S.C. 154(b) by 0 days.

(21) Appl. No.: 15/152,572

(22) Filed: May 12, 2016

(51) Int. Cl.
*A47B 9/20* (2006.01)
*F16B 7/14* (2006.01)

(52) U.S. Cl.
CPC .............. *A47B 9/20* (2013.01); *F16B 7/1445* (2013.01)

(58) Field of Classification Search
CPC .... A47B 9/00; A47B 9/02; A47B 9/08; A47B 9/14; A47B 9/20; A47B 2200/0051
USPC ......... 108/144.11, 147, 146, 147.19, 147.21, 108/148, 106; 248/414, 188.5, 188.2, 248/188.3, 188.1
See application file for complete search history.

(56) References Cited

U.S. PATENT DOCUMENTS

| 2,806,722 | A | * | 9/1957 | Atkins | E04H 12/182 248/413 |
| 3,285,207 | A | * | 11/1966 | Vom Hagen | A47B 9/083 108/106 |
| 3,347,511 | A | * | 10/1967 | Myers | B65G 27/08 108/147 |
| 3,887,155 | A | * | 6/1975 | Bertalot | F16B 7/10 108/147.19 |
| 4,080,080 | A | * | 3/1978 | Cisler | A47B 9/14 248/188.5 |
| 4,111,389 | A | * | 9/1978 | Gundlach | A47B 27/16 248/162.1 |
| 4,381,095 | A | * | 4/1983 | Kritske | A47B 9/20 108/147.19 |
| 4,627,591 | A | * | 12/1986 | Heckmann | A47B 9/06 108/148 |
| 4,667,605 | A | * | 5/1987 | Bastian | A47B 9/20 108/106 |
| 4,807,836 | A | * | 2/1989 | Price | A47B 27/14 108/147 |
| 5,285,733 | A | * | 2/1994 | Waibel | A47B 9/20 108/147.19 |
| 5,339,750 | A | * | 8/1994 | Smies | A47B 9/04 108/147 |
| 8,430,218 | B2 | * | 4/2013 | Klinke | A47B 9/20 188/300 |
| 9,144,301 | B2 | * | 9/2015 | Riis | A47B 9/20 |
| 9,204,715 | B2 | * | 12/2015 | Bonuccelli | A47B 9/20 |
| 9,247,806 | B2 | * | 2/2016 | Lorenzen | A47B 9/20 |
| 2002/0050112 | A1 | * | 5/2002 | Koch | A47B 9/20 52/651.07 |

(Continued)

*Primary Examiner* — Jose V Chen
(74) *Attorney, Agent, or Firm* — Leong C. Lei

(57) ABSTRACT

An elevation table includes a tabletop and a table leg frame mounted to the tabletop. The table leg frame includes a fixed leg, a movable leg insertable into the fixed leg, and an extendible/retractable bar arranged inside the fixed leg and the movable leg. The movable leg has an end connected to the tabletop and an opposite end receiving a first positioning sleeve to fit thereto and insertable into the fixed leg. The fixed leg has an end into which the movable leg is insertable and receives a second positioning sleeve to fit thereto. The first and second positioning sleeves each include embedding holes formed in at least two sidewalls thereof and the embedding holes receive embedded pieces to be fit therein. The first and second positioning sleeves are in point contact with surfaces of the movable leg and the fixed leg by means of the embedded pieces.

6 Claims, 7 Drawing Sheets

(56) References Cited

U.S. PATENT DOCUMENTS

| | | | | |
|---|---|---|---|---|
| 2006/0130713 | A1* | 6/2006 | Jones | A47B 9/00 |
| | | | | 108/106 |
| 2015/0047538 | A1* | 2/2015 | Ergun | A47B 9/02 |
| | | | | 108/147 |
| 2016/0102693 | A1* | 4/2016 | Wang | A47C 19/024 |
| | | | | 248/161 |

\* cited by examiner

ELEVATION TABLE STRUCTURE

(a) TECHNICAL FIELD OF THE INVENTION

The present invention relates generally to an elevation table structure, and more particularly to an elevation table structure that reduces resistance of a linear motion of table legs during height adjustment of a tabletop and provide an effect of stability thereby improving the performance of the elevation table.

(b) DESCRIPTION OF THE PRIOR ART

Tables and desks are commonly used furniture for modern people. Taking an office desk as an example, functional designs are often involved to suit specific needs of work carried out thereon, such as descending/ascending.

As shown in FIG. 1, an elevation table 1 that may be ascended and descended comprises a tabletop 11 and a table leg frame 12 supporting the tabletop 11, wherein the table leg frame 12 comprises a fixed leg 121, a movable leg 122, and an extendible/retractable bar 123. The movable leg 122 has an upper end connected to an undersurface of the tabletop 11. An opposite end of the movable leg 122 is insertable into the fixed leg 121. The extendible/retractable bar 123 is arranged inside the fixed leg 121 and the movable leg 122. The extendible/retractable bar 123 may comprise a pneumatic bar or a hydraulic bar. The extendible/retractable bar 123 drives the movable leg 122 to do upward movement or downward movement so as to ascend or descend the tabletop 11 thereby adjusting the height thereof to suit the needs of a user.

As shown in FIGS. 2 and 3, the movable leg 122 is inserted into the fixed leg 121 and the movable leg 122 is movable linearly in the fixed leg 121. The movable leg 122 and the fixed leg 121 are arranged in a slidable fitting manner and due to the slidable fitting arrangement of the movable leg 122 and the fixed leg 121, a certain play or clearance must be present between the movable leg 122 and the fixed leg 121 to allow for smooth linear movement of the movable leg 122 in the fixed leg 121. Further, the movable leg 122 and the fixed leg 121 have predetermined lengths or, speaking in a more precise way, the lengths of the movable leg 122 and the fixed leg 121 determine the distance of the tabletop 11 from the ground. Thus, to ensure stability of the upward/downward linear movement of the movable leg 122 in the fixed leg 121, the end of the movable leg 122 that is inserted into the fixed leg 121 is provided with a first positioning sleeve 13 fit thereto, and in addition, the end of the fixed leg 121 into which the insertion end of the movable leg 122 is inserted is provided with a second positioning sleeve 14 to fit thereto. To speak in a more precise manner, the movable leg 122 and the fixed leg 121 receive the first positioning sleeve 13 and the second positioning sleeve 14 to be arranged therebetween. With the arrangement of the first positioning sleeve 13 and the second positioning sleeve 14, the movable leg 122 may move in a stable manner in the fixed leg 121 to undergo upward and downward linear movement.

The above-described structure of the conventional elevation table 1 allows the tabletop 11 ascend or descend. However, stability of the upward/downward linear movement of the movable leg 122 in the fixed leg 121 relies on the arrangement of the first positioning sleeve 13 and the second positioning sleeve 14. The first positioning sleeve 13 is movable in unison with the movable leg 122 for the upward/downward linear movement and thus, the first positioning sleeve 13 is in surface contact with inside surfaces of the fixed leg 121 and consequently, a large resisting force is induced. The second positioning sleeve 14 is also in surface contact with outside surfaces of the movable leg 122 to induce a large resisting force. When the resistance is excessive (this indicating the clearance is small and the operation stability is good), the pressure for extension/retraction of the extendible/retractable bar 123 must be adjusted accordingly. When the resistance is low this indicating the clearance is excessively large), the upward/downward linear movement of the movable leg 122 in the fixed leg 121 would be instable. The conventional elevation table 1 would encounter one of these two drawbacks that cannot be overcome simultaneously.

Thus, it is a challenge of the manufacturers of elevation tables to provide an elevation table structure that allows for stable and smooth ascending or descending operation.

SUMMARY OF THE INVENTION

The primary object of the present invention is to provide an elevation table structure, which overcomes the drawbacks of the conventional elevation table that the excessive resistance or instability of operation might occur during the adjustment of height.

Thus, according to the technical solution provided in claim 1, the present invention provides an elevation table structure, wherein the elevation table comprises a tabletop and a table leg frame mounted to an undersurface of the tabletop. The table leg frame comprises a fixed leg, a movable leg insertable into the fixed leg, and an extendible/retractable bar arranged inside the fixed leg and the movable leg. The movable leg has an end connected to the tabletop and an opposite end receiving a first positioning sleeve to fit thereto and insertable into the fixed leg. The fixed leg has an end into which the movable leg is insertable and receives a second positioning sleeve to fit thereto. The first positioning sleeve comprises embedding holes formed in at least two sidewalls thereof and the embedding holes receive embedded pieces to be fit therein. The second positioning sleeve comprises embedding holes formed in at least two sidewalls thereof and the embedding holes receive embedded pieces to be fit therein. The first positioning sleeve and the second positioning sleeve are in point contact with surfaces of the movable leg and the fixed leg by means of the embedded pieces.

The efficacy that the technical solution of the present invention provided in claim 1 may achieve is that with the embedding holes formed in at least two sidewalls of the first positioning sleeve and the embedding holes receiving the embedded pieces that are elastic to fit therein and the embedding holes formed in at least two sidewalls of the second positioning sleeve and the embedding holes receiving the embedded pieces that are elastic to fit therein, the first positioning sleeve and the second positioning sleeve may establish point contact with surfaces or sidewalls of the movable leg and the fixed leg by means of the embedded pieces so that the resistance against the linear movement of the movable leg in the fixed leg can be effectively and greatly reduced to ensure better stability of the linear movement of the movable leg in the fixed leg thereby improving the performance of use of the elevation table.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
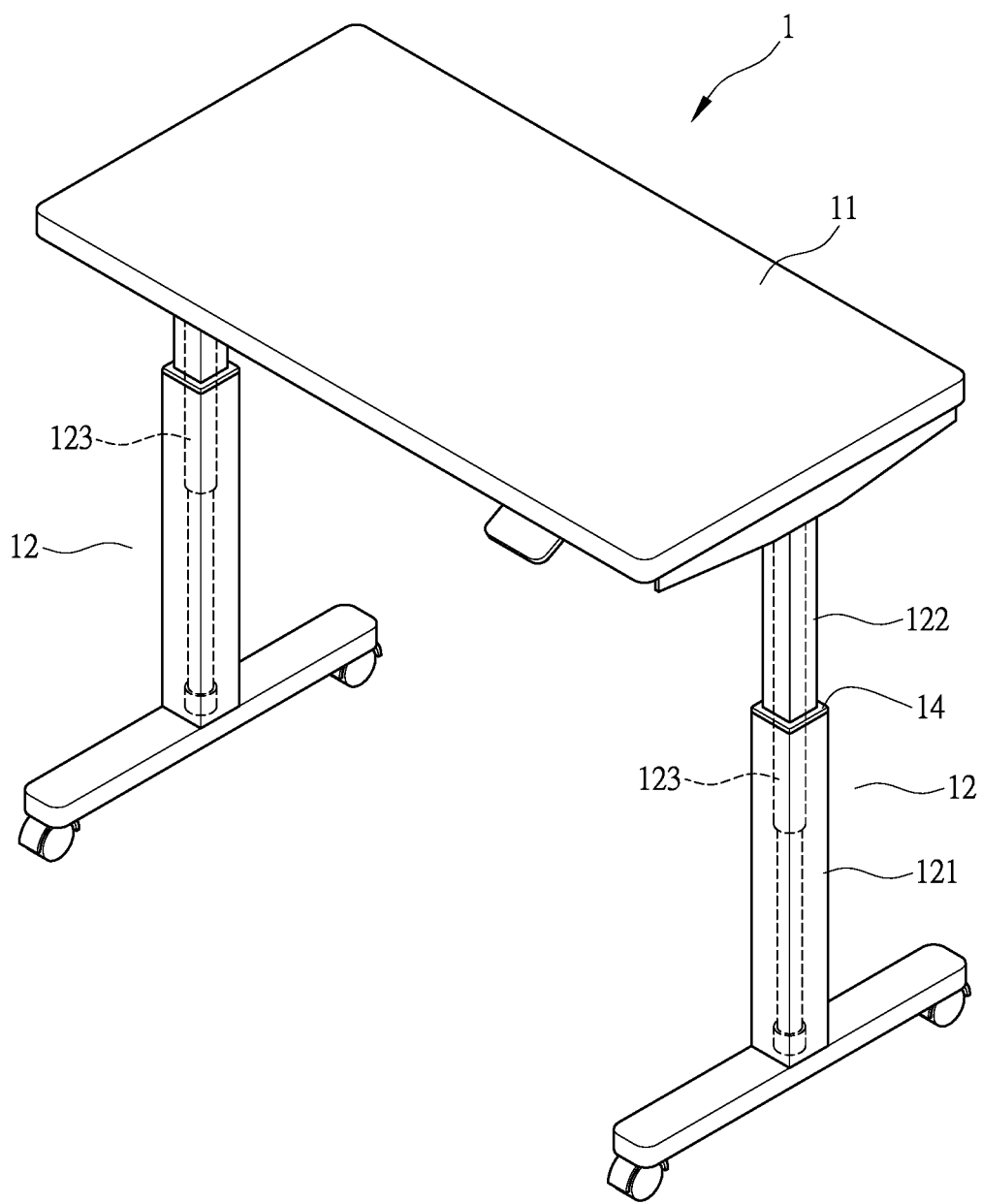
FIG. 1 is a schematic view showing a conventional elevation table.
Figure 2:
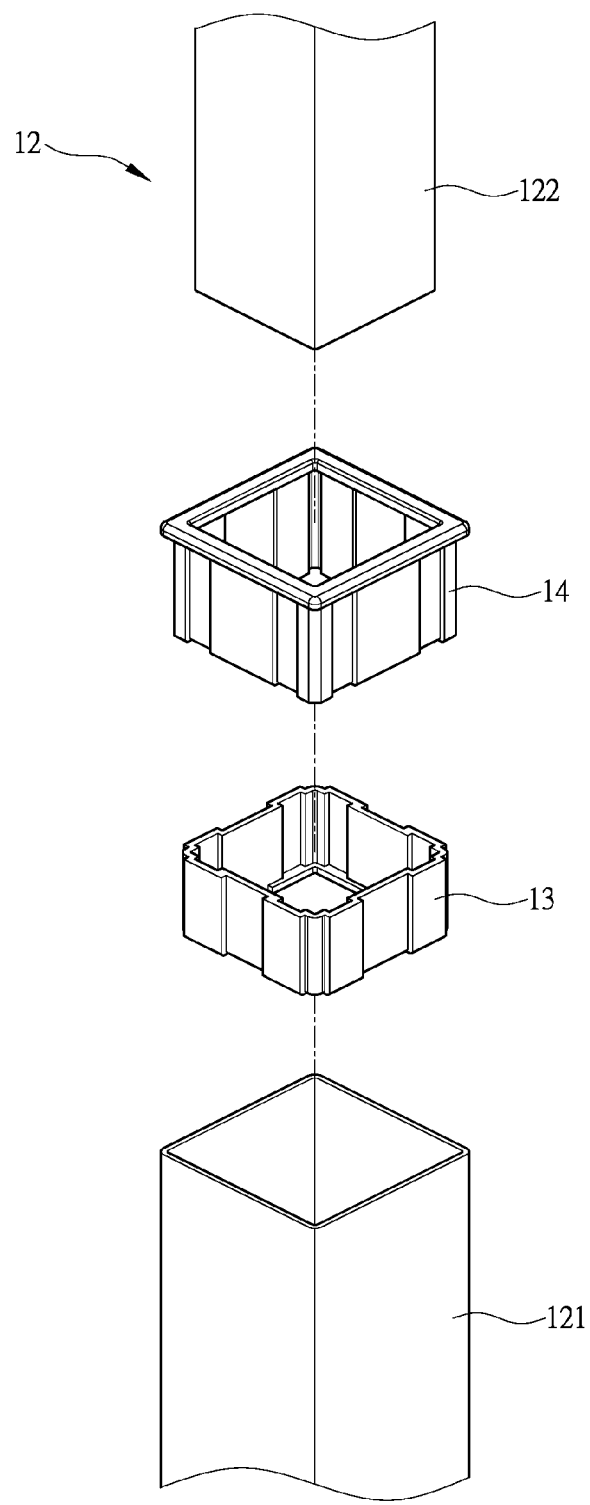
FIG. 2 is an exploded view of a table leg frame of the conventional elevation table.
Figure 3:
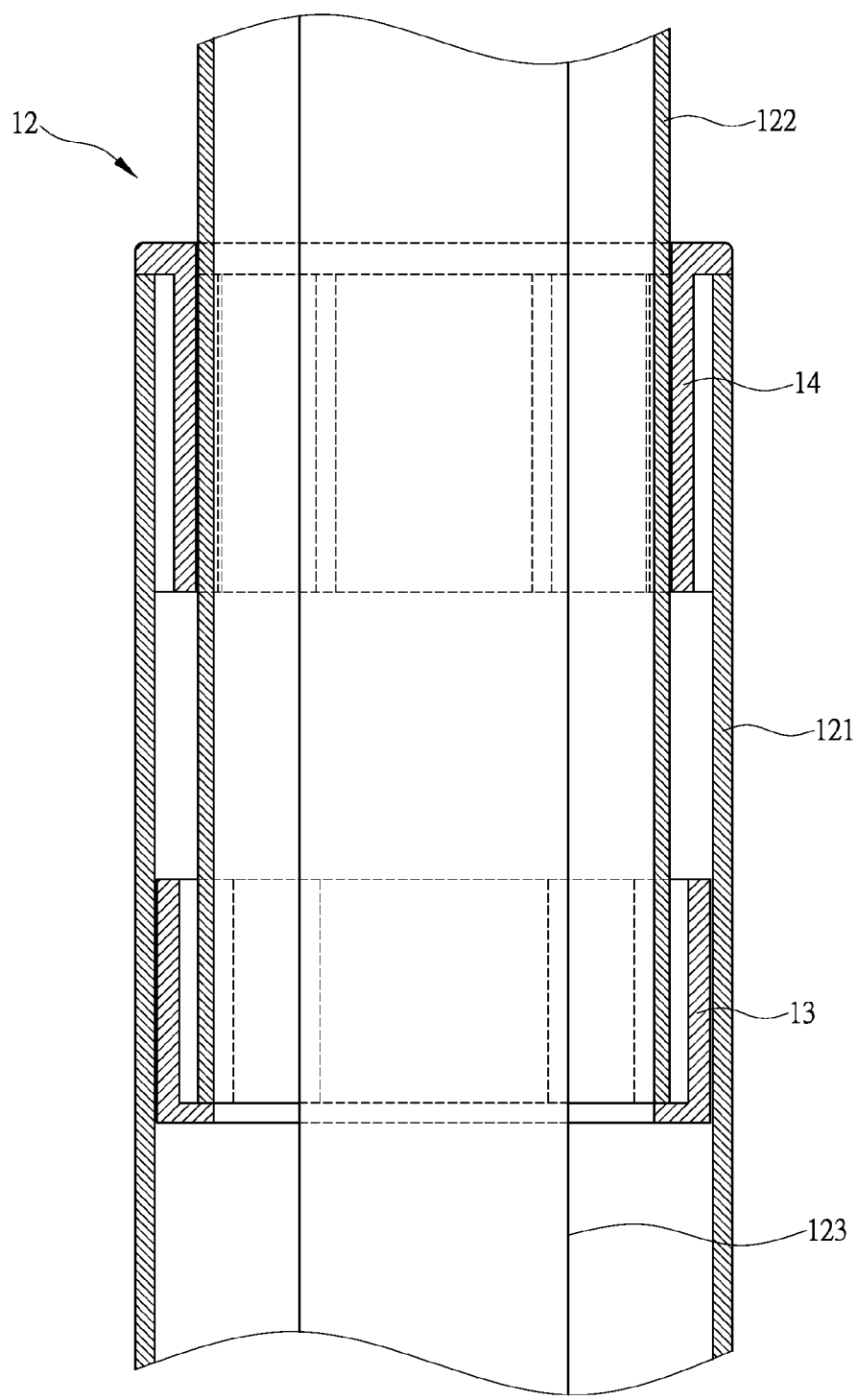
FIG. 3 is a schematic view illustrating an operation of the table leg frame of the conventional elevation table.
Figure 4:
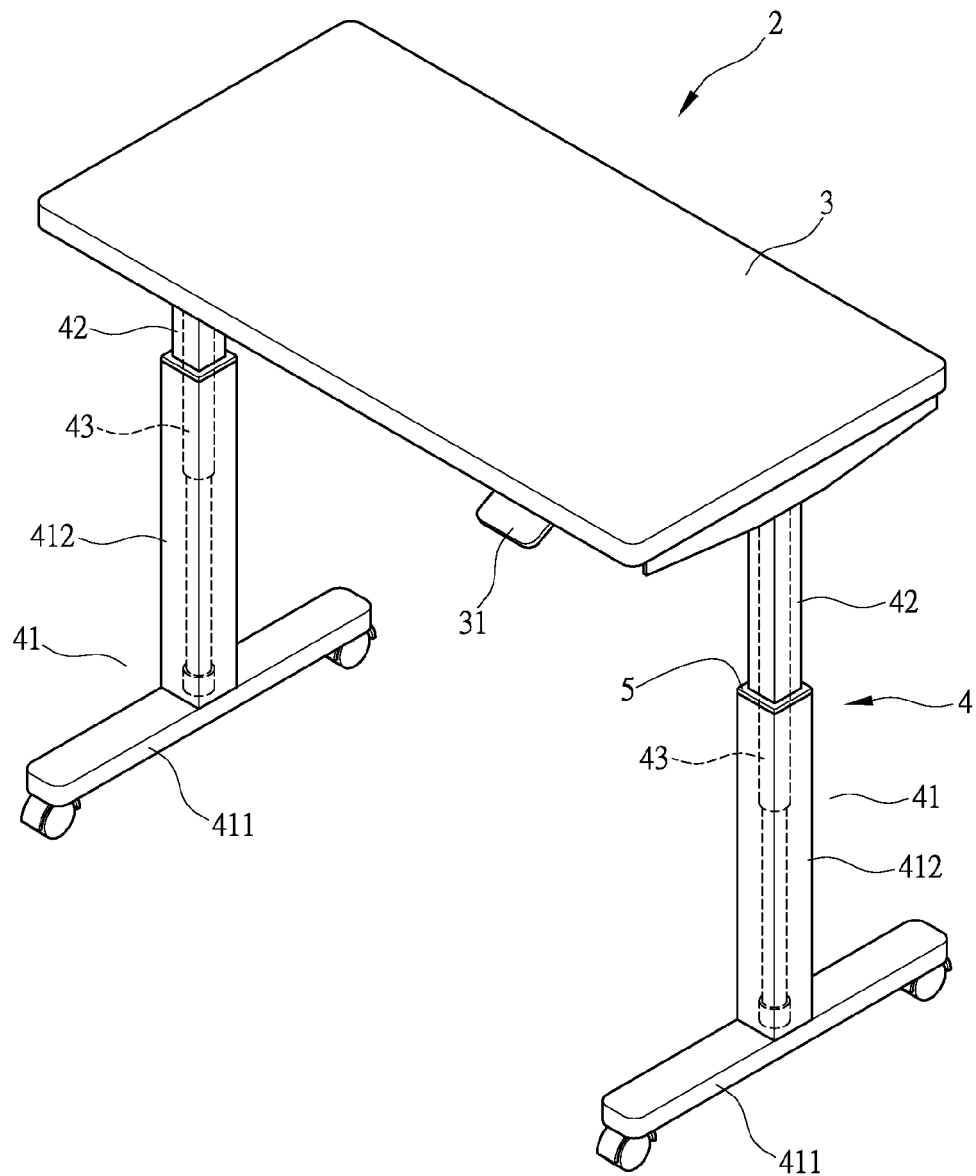
FIG. 4 is a perspective view showing an elevation table according to the present invention.

Firstly, referring initially to FIG. 4, the present invention provides an elevation table structure. The elevation table 2 comprises a tabletop 3 and a table leg frame 4 mounted to an undersurface of the tabletop 3.

As shown in FIG. 4, the tabletop 3 comprises a plate in the form of any desired shape and the undersurface of the tabletop 3 is connected to the table leg frame 4 and a control operator 31.

As shown in FIG. 4, the table leg frame 4 is connected to the undersurface of the tabletop 3 such that the tabletop 3 is supported in position by the table leg frame 4. The table leg frame 4 comprises a fixed leg 41, a movable leg 42 telescopically insertable in the fixed leg 41, and an extendible/retractable bar 43 received in the fixed leg 41 and the movable leg 42.

Figure 5:
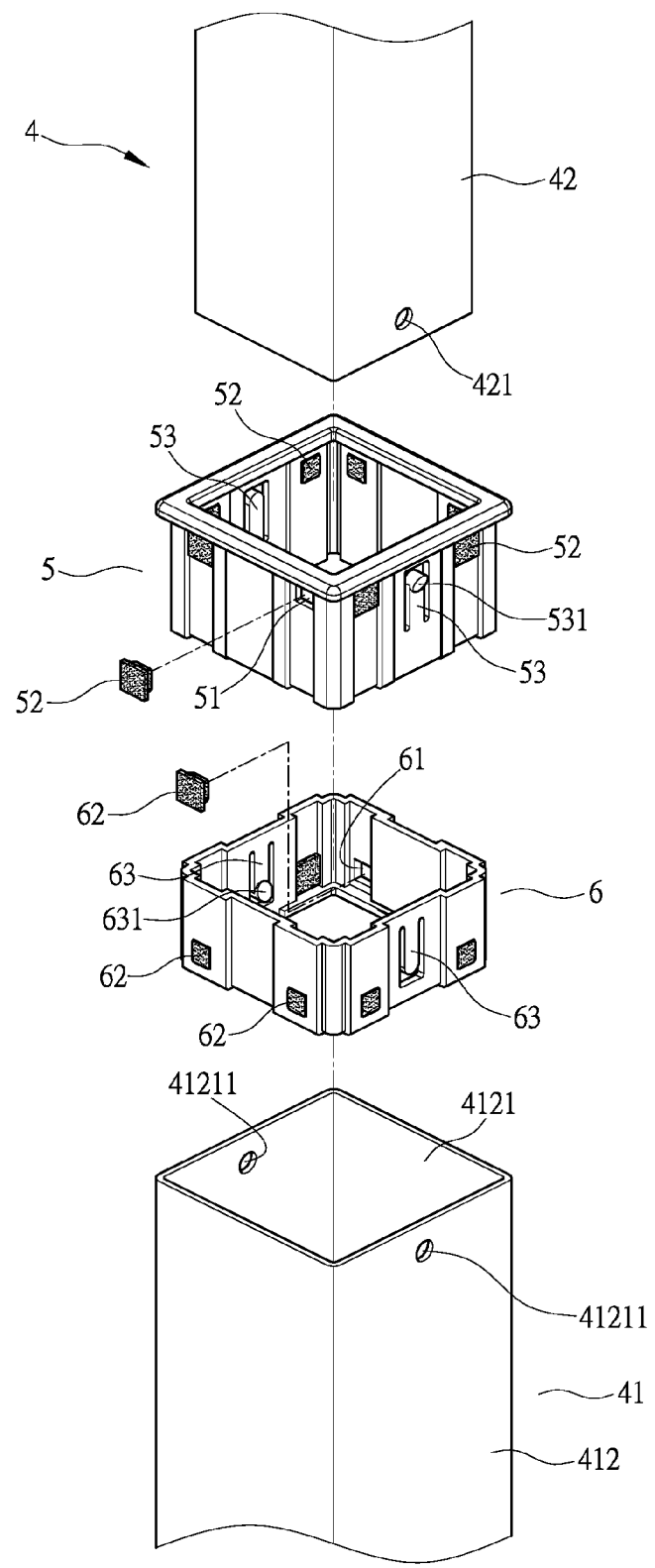
FIG. 5 is an exploded view of a table leg frame of the elevation table according to the present invention.

As shown in FIGS. 4 and 5, the fixed leg 41 comprises a horizontal leg section 411 and a vertical leg section 412. The horizontal leg section 411 is positionable on or mounted to a fixture surface, such as ground. The vertical leg section 412 is in the form of a hollow frame and the vertical leg section 412 has an upper end comprising an opening portion 4121. The opening portion 4121 has opposite sidewalls in which the through holes 41211 are formed; and the opening portion 4121 receives a second positioning sleeve 5 to fit thereto.

As shown in FIGS. 4 and 5, the movable leg 42 is in the form of a hollow frame and the movable leg 42 has an upper end connected to the undersurface of the tabletop 3. An opposite end of the movable leg 42 is insertable into the vertical leg section 412 of the fixed leg 41. The end portion of the movable leg 42 that is insertable into the fixed leg 41 has opposite sidewalls in which through holes 421 are formed and has an outer circumferential surface to which a first positioning sleeve 6 is fit.

As shown in FIG. 4, the extendible/retractable bar 43 is in the form of a power cylinder, such as pneumatic bar or a hydraulic bar. The extendible/retractable bar 43 is controlled by the control operator 31 of the tabletop 3. The extendible/retractable bar 43 is arranged in the vertical leg section 412 of the fixed leg 41 and the movable leg 42 such that an operation of the extendible/retractable bar 43 may drive the movable leg 42 to undergo a linear movement in the vertical leg section 412 of the fixed leg 41 in an upward/downward direction so as to ascend or descend the tabletop 3.

Figure 6:
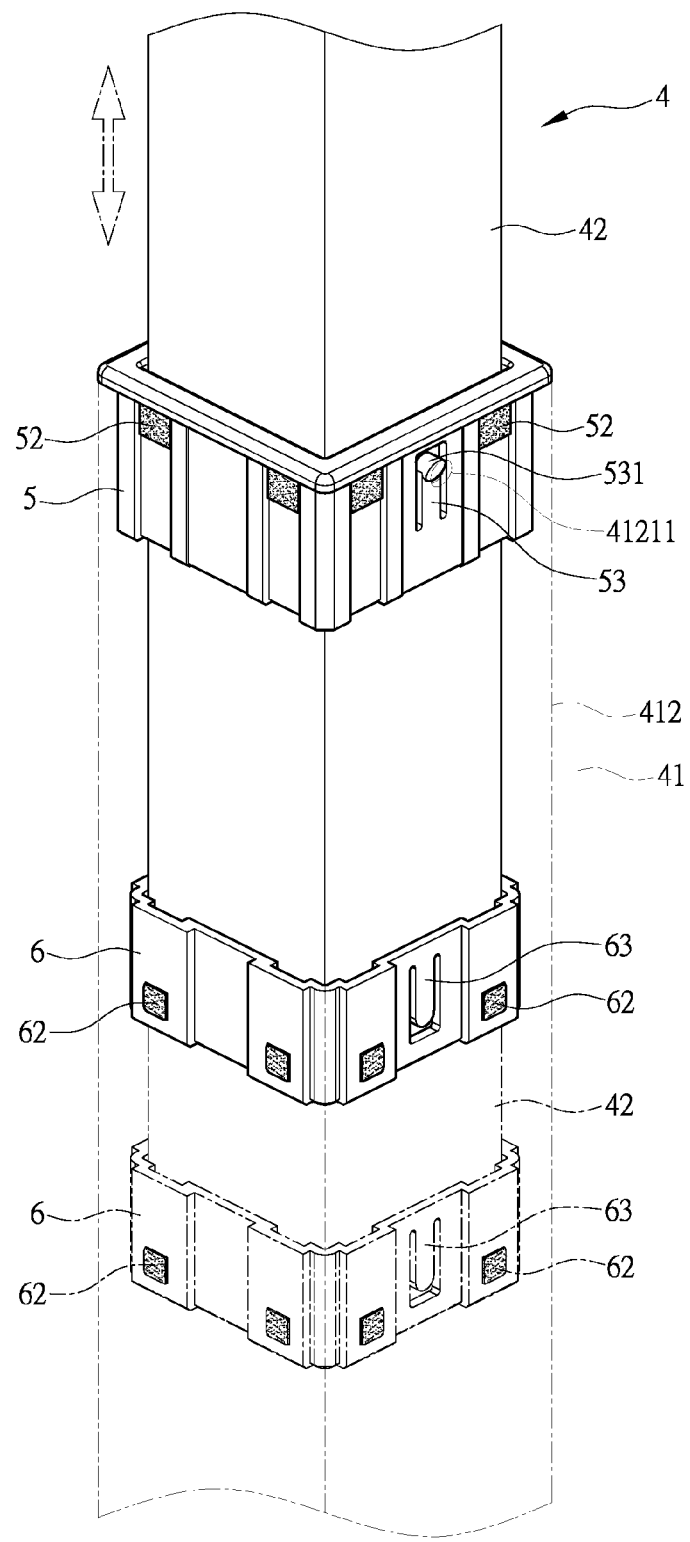
FIG. 6 is a schematic view illustrating an operation of the table leg frame of the elevation table according to the present invention.
Figure 7:
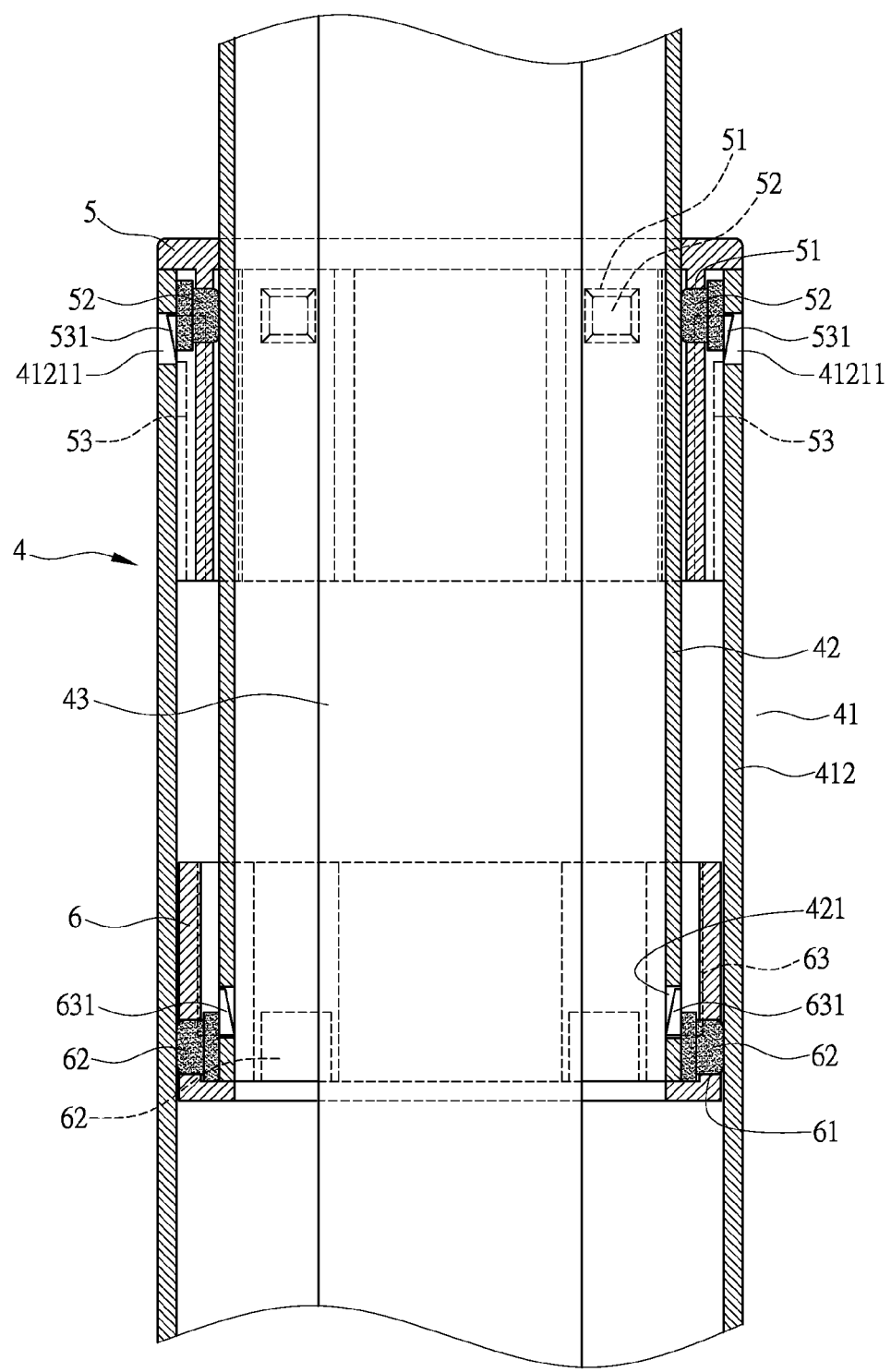
FIG. 7 is a cross-sectional view showing the table leg frame of the elevation table according to the present invention.

As shown in FIGS. 5 and 6, the second positioning sleeve 5 is in the form of a hollow loop-like frame. The second positioning sleeve 5 comprises embedding holes 51 formed in at least two sidewalls thereof and the embedding holes 51 receive embedded pieces 52 that are of elasticity to be fit, retained, and embedded therein. In an embodiment of the present invention, the second positioning sleeve 5 has four sidewalls each of which is provided with two embedding holes 51 formed therein. Each of the embedding holes 51 receives an embedded piece 52 fit, retained, and embedded therein. The second positioning sleeve 5 comprises retention spring plates 53 formed thereon and projecting therefrom to respectively correspond to the through holes 41211 of the fixed leg 41. The retention spring plates 53 are each provided with a retention peg 531 projecting therefrom in a sideway direction. The retention pegs 531 are respectively engageable with and fit into the through holes 41211 of the fixed leg 41 in order to have the second positioning sleeve 5 securely fixed at the end of the fixed leg 41.

As shown in FIGS. 5 and 6, the first positioning sleeve 6 is in the form of a hollow loop-like frame. The first positioning sleeve 6 comprises embedding holes 61 formed in at least two sidewalls thereof and the embedding holes 61 receive embedded pieces 62 that are of elasticity to be fit, retained, and embedded therein. In an embodiment of the present invention, the first positioning sleeve 6 has four sidewalls each of which is provided with two embedding holes 61 formed therein. Each of the embedding holes 61 receives an embedded piece 62 fit, retained, and embedded therein. The first positioning sleeve 6 comprises retention spring plates 63 formed thereon and projecting therefrom to respectively correspond to the through holes 421 of the movable leg 42. The retention spring plates 63 are each provided with a retention peg 631 projecting therefrom in a sideway direction. The retention pegs 631 are respectively engageable with and fit into the through holes 421 of the movable leg 42 in order to have the first positioning sleeve 6 securely fixed at the end of the movable leg 42.

As shown in FIGS. 4, 5, 6, and 7, to use the elevation table 2 of the present invention, when a user attempts to adjust the height of the tabletop 3, the control operator 31 arranged on the undersurface of the tabletop 3 is pulled or otherwise actuated first to release a holding pressure of the extendible/retractable bar 43. Under this condition, the user may push downward or pull upward the tabletop 3, meanwhile the extendible/retractable bar 43 is extended or retracted to follow the change of the height of the tabletop 3. The extendible/retractable bar 43 drives the movable leg 42 to do linear movement in the fixed leg 41 in the upward direction or downward direction. Due to the facts that the end of the movable leg 42 that is received in the fixed leg 41 comprises the first positioning sleeve 6 fit thereto and the end of the vertical leg section 412 of the fixed leg 41 comprises the second positioning sleeve 5 fit thereto; the first positioning sleeve 6 comprises a plurality of embedded pieces 62 formed therein and the second positioning sleeve 5 comprises a plurality of embedded pieces 52 formed therein such that side faces of the embedded pieces 62 of the first positioning sleeve 6 and side faces of the embedded pieces 52 of the second positioning sleeve 5 are respectively in abutting engagement with outside surfaces of the movable leg 42 and inside surfaces of the vertical leg section 412 of the fixed leg 41, and more clearly speaking, the first positioning sleeve 6 and the second positioning sleeve 5 are not in contact with the outside surfaces of the movable leg 42 and the inside surfaces of the fixed leg 41 and the engagement with the outside surfaces of the movable leg 42 and the inside surfaces of the fixed leg 41 is achieved with the embedded pieces 52, 62, the first positioning sleeve 6 and the second positioning sleeve 5 may be set in point contact with the surfaces of the movable leg 42 and the fixed leg 41 just by means of the embedded pieces 52, 62 and resistance against the linear movement of the movable leg 42 in the fixed leg 41 can be greatly reduced to ensure better stability of the linear movement of the movable leg 42 in the fixed leg 41 thereby improving the performance of use of the elevation table 2.

The efficacy of the present invention is that with the embedding holes 61 formed in at least two sidewalls of the first positioning sleeve 6 and the embedding holes 61 receiving the embedded pieces 62 that are elastic to fit therein and the embedding holes 51 formed in at least two sidewalls of the second positioning sleeve 5 and the embedding holes 51 receiving the embedded pieces 52 that are elastic to fit therein, the first positioning sleeve 6 and the second positioning sleeve 5 may establish point contact with surfaces or sidewalls of the movable leg 42 and the fixed leg 41 by means of the embedded pieces 52, 62 so that the resistance against the linear movement of the movable leg 42 in the fixed leg 41 can be effectively and greatly reduced to ensure better stability of the linear movement of the movable leg 42 in the fixed leg 41 thereby improving the performance of use of the elevation table 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An elevation table comprising a tabletop and a table leg frame mounted to an undersurface of the tabletop, the table leg frame comprising a fixed leg, a movable leg removably inserted into the fixed leg, and an extendible/retractable bar arranged inside the fixed leg and the movable leg, the movable leg having an end connected to the tabletop and an opposite end receiving a first positioning sleeve, the movable leg being removably inserted into the fixed leg, the fixed leg having an end into which the movable leg is removably inserted and receives a second positioning sleeve, wherein the first positioning sleeve comprises embedding holes formed in at least two sidewalls thereof and the embedding holes receive embedded pieces to be fit therein; and the second positioning sleeve comprises embedding holes formed in at least two sidewalls thereof and the embedding holes receive embedded pieces to be fit therein, the first positioning sleeve and the second positioning sleeve being in point contact with surfaces of the movable leg and the fixed leg by means of the embedded pieces.

2. The elevation table structure according to claim 1, wherein the first positioning sleeve has four sidewalls each comprising two embedding holes formed therein, the embedding holes each receiving an embedded piece fit therein.

3. The elevation table structure according to claim 1, wherein the second positioning sleeve has four sidewalls each comprising two embedding holes formed therein, the embedding holes each receiving an embedded piece fit therein.

4. The elevation table structure according to claim 1, wherein the fixed leg comprises a horizontal leg section and a vertical leg section, the horizontal leg section being adapted to be positioned on the ground, the vertical leg section being in the form of a hollow frame and having an upper end comprising an opening portion, the opening portion having through holes formed in opposite sides thereof, the opening portion receiving the second positioning sleeve to fit thereto; and the second positioning sleeve comprises retention spring plates formed thereon and projecting therefrom to respectively correspond to the through holes of the fixed leg, the retention spring plates comprising retention pegs projecting therefrom to be engageable with and fit into the through holes of the fixed leg.

5. The elevation table structure according to claim 1, wherein the movable leg has an end removably inserted into the fixed leg and comprising through holes formed in opposite sides thereof and receiving the first positioning sleeve; and the first positioning sleeve comprises retention spring plates formed thereon and projecting therefrom to respectively correspond to the through holes of the movable leg, the retention spring plates comprising retention pegs projecting therefrom to be engageable with and fit into the through holes of the movable leg.

6. The elevation table structure according to claim 1, wherein the tabletop comprises a control operator mounted to the undersurface thereof, the control operator controlling the extendible/retractable bar.

\* \* \* \* \*